(12) United States Patent
Candelaria et al.

(10) Patent No.: US 9,503,455 B2
(45) Date of Patent: Nov. 22, 2016

(54) CONTROLLING ACCESS TO STORAGE DEVICES SHARED BY HOST SYSTEMS

(71) Applicant: INTERNATIONAL BUSINESS MACHINES CORPORATION, Armonk, NY (US)

(72) Inventors: Susan K. Candelaria, Tucson, AZ (US); Thomas C. Storms, Lincoln Park, NJ (US); Peter G. Sutton, Poughkeepsie, NY (US); John G. Thompson, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 347 days.

(21) Appl. No.: 14/180,133

(22) Filed: Feb. 13, 2014

(65) Prior Publication Data

US 2015/0229642 A1    Aug. 13, 2015

(51) Int. Cl.
*G06F 15/173* (2006.01)
*H04L 29/06* (2006.01)
*H04L 29/08* (2006.01)

(52) U.S. Cl.
CPC ............ *H04L 63/10* (2013.01); *H04L 63/102* (2013.01); *H04L 67/1097* (2013.01)

(58) Field of Classification Search
CPC ................................. G06F 12/00; G06F 13/00
USPC .................................. 709/225, 223; 711/162
See application file for complete search history.

(56) References Cited

U.S. PATENT DOCUMENTS

| 6,336,187 B1 * | 1/2002 | Kern ........................ G06F 21/10 713/161 |
| 7,805,583 B1 | 9/2010 | Todd et al. |
| 8,417,899 B2 | 4/2013 | Roush |
| 2005/0166018 A1 * | 7/2005 | Miki .................... G06F 11/2069 711/117 |
| 2009/0013118 A1 * | 1/2009 | Clark .................... G06F 3/0622 710/265 |
| 2009/0119452 A1 * | 5/2009 | Bianchi ................. G06F 3/0607 711/111 |
| 2010/0211829 A1 | 8/2010 | Ziskind et al. |
| 2011/0179231 A1 * | 7/2011 | Roush .................... G06F 3/0622 711/152 |

* cited by examiner

*Primary Examiner* — Philip B Tran
(74) *Attorney, Agent, or Firm* — Griffiths & Seaton PLLC

(57) ABSTRACT

To control access to a source storage device shared by a plurality of host systems, methods and systems include confirming a presence of an application on each host system of the plurality of host systems accessing the storage device. After confirming the presence of the application on each host system accessing the storage device, the application is run allowing each host system to access the storage device. A request is received from a new host system to access the storage device. A presence of the application is verified on the new host system. If the presence of the application is verified on the new host system, the new host system is provided with access to the storage device. If the presence of the application is not verified on the new host system, the new host system is denied access to the storage device.

16 Claims, 8 Drawing Sheets

CONTROLLING ACCESS TO STORAGE DEVICES SHARED BY HOST SYSTEMS

BACKGROUND OF THE INVENTION

1. Field of the Invention

The present invention relates in general to storage devices and, in particular, to controlling access to the storage devices by new sharing host systems.

2. Description of the Related Art

In a computer environment including a plurality of host systems and a storage device, data stored on the storage device may be shared by the host systems. From time to time, data may need to be migrated from the storage device to another device, for reasons such as upgrading to newer storage technology. In this regard, the storage device may act as a source device and all of the existing data thereon may be copied to a target device. During the migration, input/output requests (I/Os) to read data and/or write data issued to the source device are monitored and propagated to the target device. After the data is migrated, in-memory control blocks on the host systems are notified to re-direct future I/Os from all applications to the target device, and the source device is swapped with the target device. As the process is relatively seamless, user applications are not aware of a change in access from the source device to the target device.

SUMMARY OF THE INVENTION

In order to monitor the I/Os issued during the migration process, each host system sharing the source device includes an instance of a migration application running thereon. Hence, as the host systems process new I/Os, the new I/Os can be written to the target device as part of the migration process. Currently, however, when new host systems are introduced into the computer environment during the migration process, those without an instance of the migration application thereon can access the source device. As a result, the new host systems' access of the storage device may go undetected and any updates made to the source device by the new host systems may be lost. Such issues also arise during the running of other non-migration applications in which multiple host systems access a storage device.

To ensure that updates made to the storage device are detected, methods and systems are provided for controlling access to a storage device shared by a plurality of host systems. In an embodiment, by way of example only, a method is provided that controls access to a storage device shared by a plurality of host systems and includes confirming a presence of an application on each host system of the plurality of host systems accessing the storage device. After confirming the presence of the application on each host system accessing the storage device, the application is run allowing each host system to access the storage device. A request is received from a new host system to access the storage device. A presence of the application is verified on the new host system. If the presence of the application is verified on the new host system, the new host system is provided with access to the storage device. If the presence of the application is not verified on the new host system, the new host system is denied access to the storage device.

In another embodiment, by way of example only, a system is provided for controlling access to a storage device shared by a plurality of host systems. The system includes a memory and at least one processing device coupled to the memory. The at least one processing device is configured to confirm a presence of an application on each host system of the plurality of host systems accessing the storage device, after confirming the presence of the application on each host system accessing the storage device, run the application allowing each host system to access the storage device, receive a request from a new host system to access the storage device, and verify a presence of the application on the new host system. If the presence of the application is verified on the new host system, the at least one processing device provides the new host system with access to the storage device. If the presence of the application is not verified on the new host system, the at least one processing device denies the new host system access to the storage device.

In another embodiment, by way of example only, a physical computer storage medium is provided including a computer program product for controlling access to a storage device shared by a plurality of host systems. The physical computer storage medium includes computer code for confirming a presence of an application on each host system of the plurality of host systems accessing the storage device, computer code for, after confirming the presence of the application on each host system accessing the storage device, running the application allowing each host system to access the storage device, computer code for receiving a request from a new host system to access the storage device, computer code for verifying a presence of the application on the new host system, computer code for, if the presence of the application is verified on the new host system, providing the new host system with access to the storage device, and computer code for, if the presence of the application is not verified on the new host system, denying the new host system access to the storage device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Methods and systems are provided for controlling access to a storage device shared by a plurality of host systems during the running of an application, such as migration. While the application runs, the methods and systems allow all of the host systems that are sharing the source storage device to continue to access the storage device, prevent new systems without an instance of the application from accessing the storage device, and allow new systems with an instance of the application to access the storage device.

To control the access, a new command is provided as part of the application and a response to the command is issued from a controller controlling the storage device, such as a disk storage control unit (CU). In this regard, the new command allows the application to instruct to the CU not to allow any new access success responses to be sent from a given device (e.g., the storage device). By preventing the device from issuing new access success responses, a "fence" is effectively formed around the device so that when a new host system attempts to communicate with the device by issuing an access command or any other requests to access the device, the device will not allow the access command to successfully execute and hence, the new host system will fail to bring the device online.

To allow new sharing host systems to begin accessing a device that is already fenced if the new sharing host system has an instance of the migration application running on it, a "force" parameter is also added to the existing access command. Inclusion of the force parameter allows an access command to effectively bypass the fence. As a result, when the device receives the access command from the new host system, the device is free to send an access success response to the new host system allowing successful execution of the access command and bringing the device online. Additionally, a new interface allowing the application to inform the system that it is running on its corresponding host system is provided as well.

Figure 1:
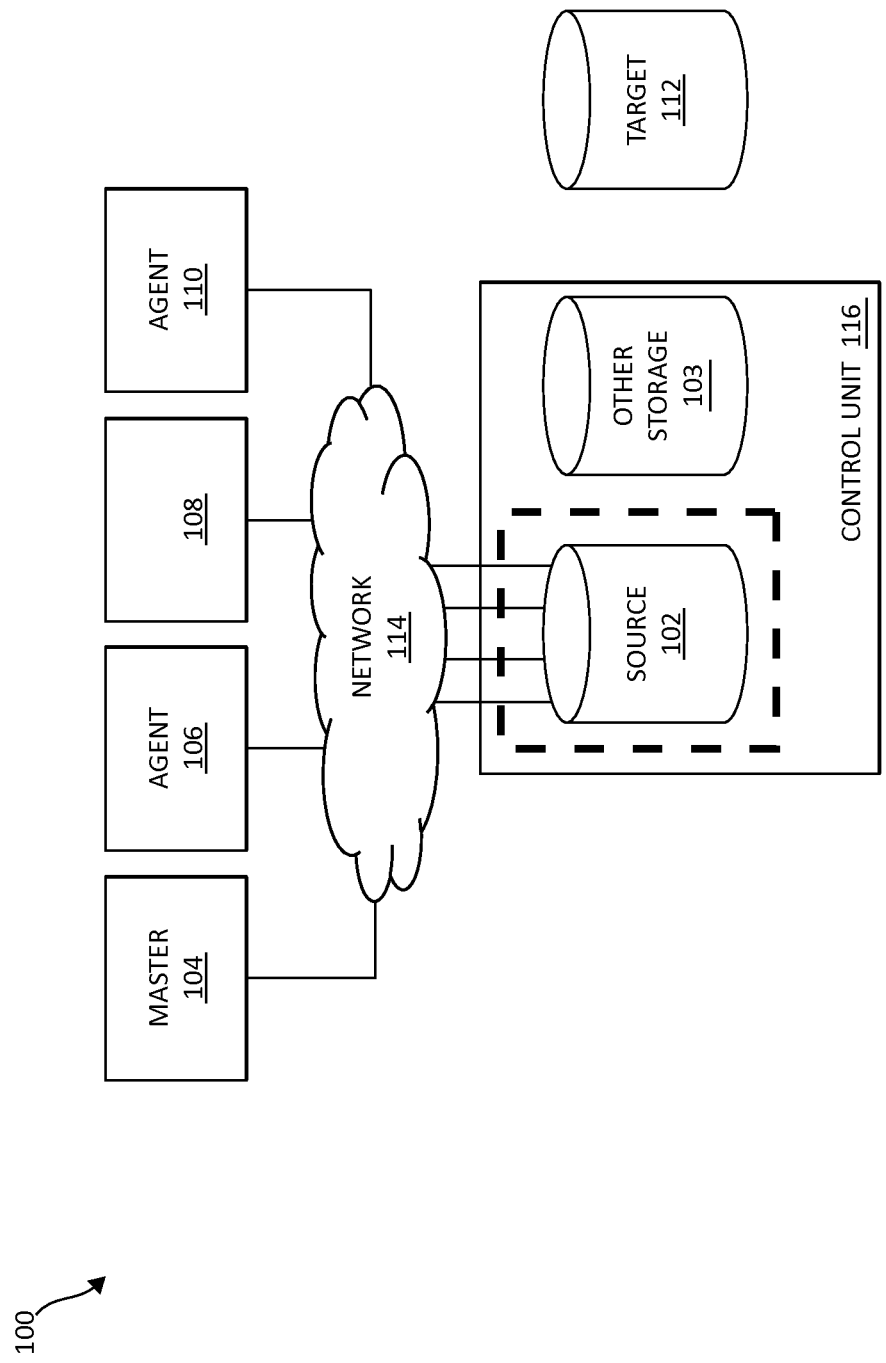
FIG. 1 is a block diagram of a system including a source storage device that is shared among a plurality of host systems, in accordance with an embodiment.

FIG. 1 is a simplified block diagram of a system 100 or computer environment including a source storage device 102 that is shared among a plurality of host systems 104, 106, 108, and 110. Source storage device 102 is included as part of a control unit 116 suitable for employing the access command. In an embodiment, control unit 116 also includes other storage devices 103, in addition to source storage device 102. In an example in which migration occurs, source storage device 102 is communicatively coupled to a target storage device 112, which stores data migrated from source storage device 102. In an embodiment, source device 102, other storage device 103, and target storage device 112 are configured substantially similarly to each other and may be random access memory devices (RAM), read-only memory devices, (ROM), non-volatile memory devices, and the like, having substantially similar memory capacity. Storage devices 102, 103, and 112 may comprise hard disk drives, solid state drives, arrays of hard disk drives or solid-state drives, tape drives, tape libraries, CD-ROM libraries, or the like and/or may include a single or multiple levels of storage. In an alternative embodiment, storage devices 102, 103, and 112 are made up of different memory devices, either having substantially equal capacities or having more memory capacity than the other. Target storage device 112 is added to source storage device 102 prior to the execution of the software process, in an embodiment. Alternatively, target storage device 112 is included during the execution of the software process. In another embodiment in which migration does not occur, source storage device 102 is a storage device, and target storage device 112 is omitted from system 100 including data to be accessed.

As mentioned briefly above, source storage device 102 may include or be part of multiple other storage devices 103 and/or systems. Source storage device 102 and other storage devices 103 are connected to each other by a storage network (not shown), such as a storage area network (SAN) (e.g., Fibre Channel (FC), Enterprise Systems Connection (ESCON), Small Computer Systems Interface (SCSI), Internet SCSI (iSCSI), Serial Storage Architecture (SSA), High Performance Parallel Interface (HIPPI), or other protocols with similar functions), a LAN (Local Area Network), a Fibre Channel interface or other host interface protocols.

Host systems 104, 106, 108, and 110 communicate with control unit 116, and hence, source storage device 102, via a network 114, for example, a wide area network (WAN), a local area network (LAN), a private intranet, or the Internet. As will be appreciated by those with skill in the art, each host system 104, 106, 108, and 110 includes at least a memory (not shown) for storing computer instructions making up the application and a processing device (not shown), such as a central processing unit for executing the stored computer instructions and/or programs and thereby providing a variety of computing functions to host systems 104, 106, 108, and 110. Any memory and/or processor and configuration thereof suitable for use in a computer network or system is included as part of host system 104, 106, 108, and 110. For example, host system 104, 106, 108, and 110 may be servers that host applications for providing computing services such as web services and database applications.

In an embodiment, system 100 operates in a master/agent configuration where, for example, host system 104 serves as a master host system and governs operation of system 100, while host systems 106, 108, and 110 serve as agent host systems. Master host system 104 communicates with control unit 116, which includes one or more processors (not shown) for controlling and performing the operation of control unit 116. Control unit 116 also communicates with agent host systems 106, 108, and 110 and target storage device 112. Control unit 116 includes memory, including a cache for storing computer program instructions and data associated with the control and processing functions in control unit 116. Although system 104 is illustrated as being the master, it will be appreciated that one of host systems 106 or 110 alternatively may serve as a master, while the others serve as agents. Additionally, each of host systems 106 or 110 may include applications running thereon that may include a storage management program for managing the operation of data storage systems. Host systems 104, 106, 108, and 110 are configured substantially similarly to each other, in an embodiment. In another embodiment, one or more of host systems 104, 106, 108, or 110 is configured differently from the others.

From time to time, a new application may be initiated on system 100 instructing host systems 104 through 110 to access data stored in source storage device 102. In an embodiment, the application instructs source storage device 102 to migrate data to target storage device 112, while in another embodiment, the application instructs host systems 104 through 110 to access source storage device 104 for a different purpose. In any case, each instance of the application on the master host system 104 and on all agent host systems 106, 108, and 110 invokes a new interface provided by the host systems, which informs the corresponding host system that the application is running on the corresponding host system.

As briefly noted above, the new interface includes a new set of commands, including a fence command that is used to set a "fence" around the device. When the fence is set around the device, it can only be breached with a "force" parameter, which is a new parameter included on an existing access command propagated by those host systems including the application. Thus, when the host systems including the application issue an access command attempting to access source storage device 104, those access commands will be allowed to successfully execute on the corresponding host systems.

Figure 2:
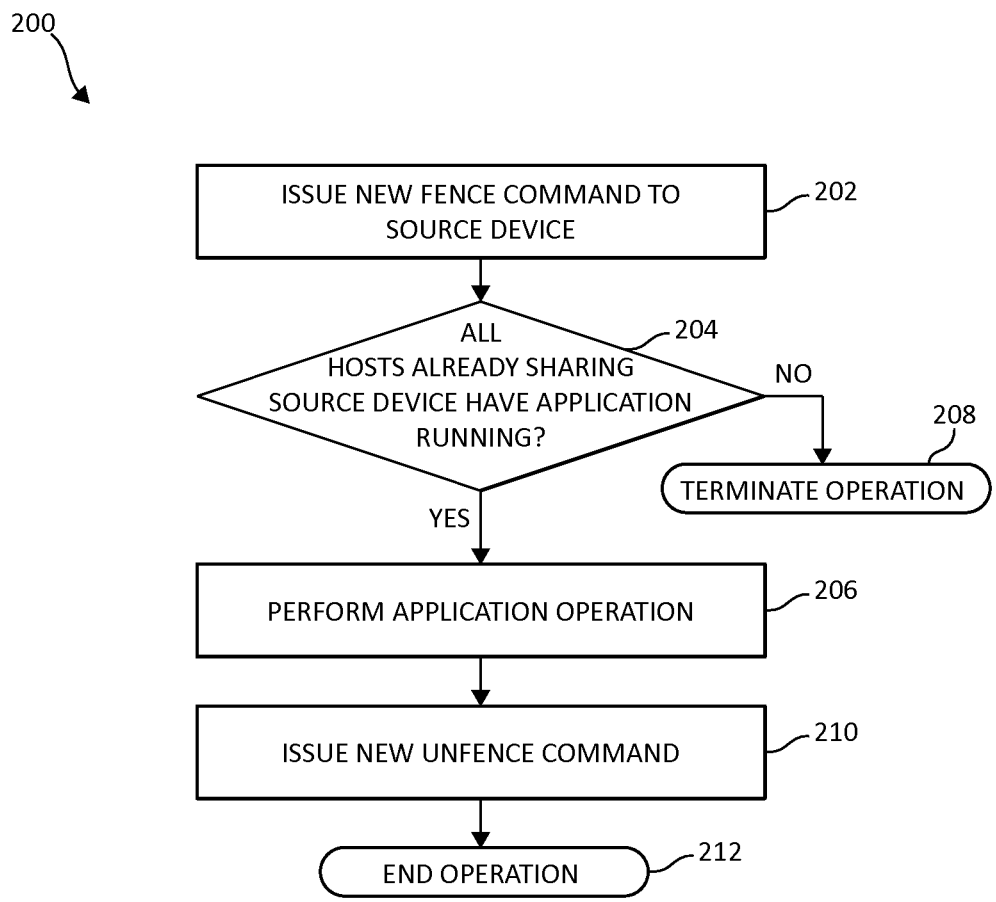
FIG. 2 is a flow diagram of a method of running an application on a master host system, in accordance with an embodiment.

FIG. 2 is a flow diagram illustrating a method 200 of running an application on a master host system 104 of an operating system 100, according to an embodiment. In particular, method 200 begins with issuance of a new fence command at 202. In an embodiment, as part of the initiation or during the running of the application on master host system 104, master host system 104 sends the new fence command to a device, for example, source storage device 102. Source storage device 102 receives the fence command, which sets the fence around device 102. The new fence command is integrated into the device access initiation protocol, which includes commands such as the Set Path ID (SPID) command, which informs the targeted data storage device, in this case, source storage device 102, of the identity of a host system (e.g., master host system 104) and the logical communications paths between the host system and the targeted data storage device. In other embodiments, the fence command is integrated with other initiation or device bring-up commands.

At 204, a determination is made as to whether an application is running on all host systems sharing a device. In an example, after master host system 104 sets the fence, master host system 104 consults a table or other data file stored either at CU 116 or at another portion of source storage device 102 including a listing of all host systems sharing device 102. In addition to information relating to which host systems are sharing device 102, the data file identifies which host systems on the list include the application and which do not. In any case, master host system 104, using the data file, confirms whether each agent host system 106, 108, and 110 includes the application.

Figure 3:
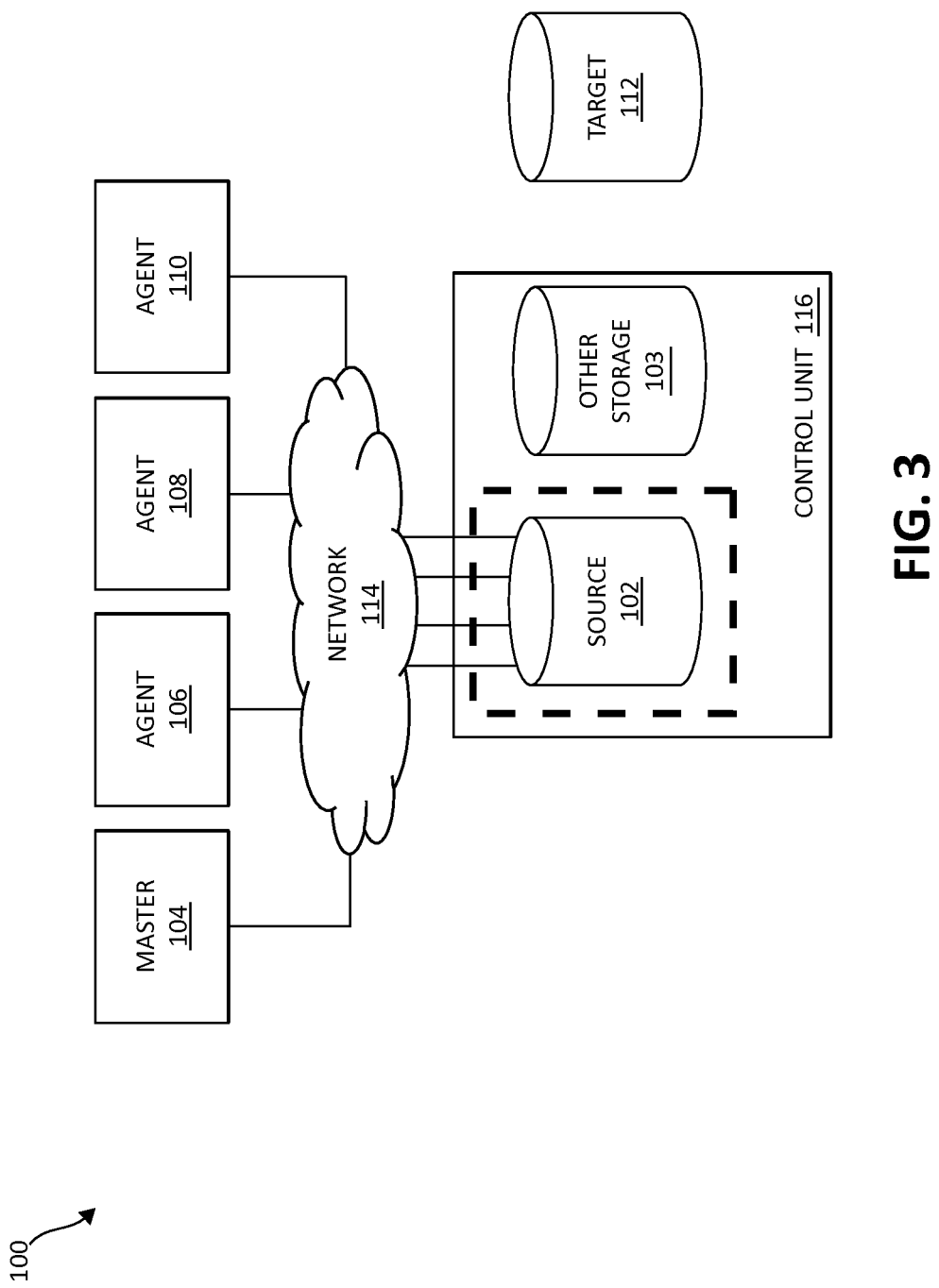
FIG. 3 is a block diagram of the system shown in FIG. 1 during a step of the method depicted in FIG. 2, in accordance with an embodiment.
Figure 4:
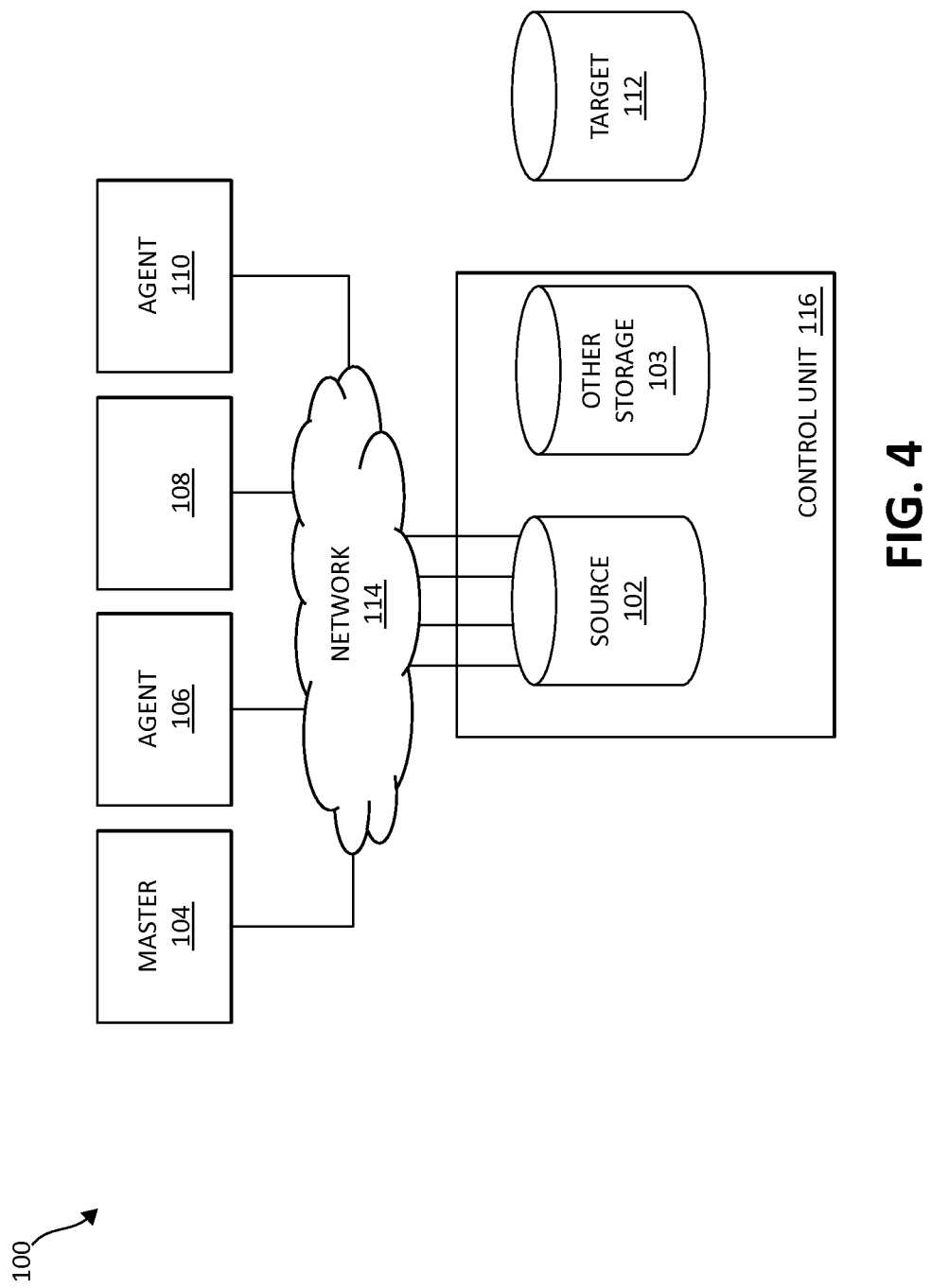
FIG. 4 is a block diagram of the system shown in FIG. 1 during another step of the method depicted in FIG. 2.

If the presence of the application is confirmed on all of the sharing host systems, such as on systems 106, 108, and 110, then host systems 106, 108, and 110 are allowed to continue access to source storage device 102 while the migration operation proceeds at 206. For example, as illustrated in FIG. 3, the presence of the migration application is confirmed on all of the host systems currently sharing source storage device 102, which includes host systems 106, 108, and 110. With reference to FIG. 4, if the presence of the migration application is not confirmed on any one (or more) hosts that are currently sharing source storage device 102 (for example, on sharing host system 108 shown in FIG. 4), master host 104 terminates the migration operation it is governing and any operations related thereto that are being performed by the agent host systems at 208, resulting in removal of the fence. In an embodiment, the sharing host systems 104, 106, 108, and 110 continue to have access to the device 102 but the sharing host systems 104, 106, 108, and 110 are unable to complete the performance of the migration operation.

After the application operations are performed, a new unfence command is issued at 210. In an example, in an embodiment, master host system 104 sends an "unfence" command to source storage device 102 and the fence is removed. The operation then ends at 212.

Figure 5:
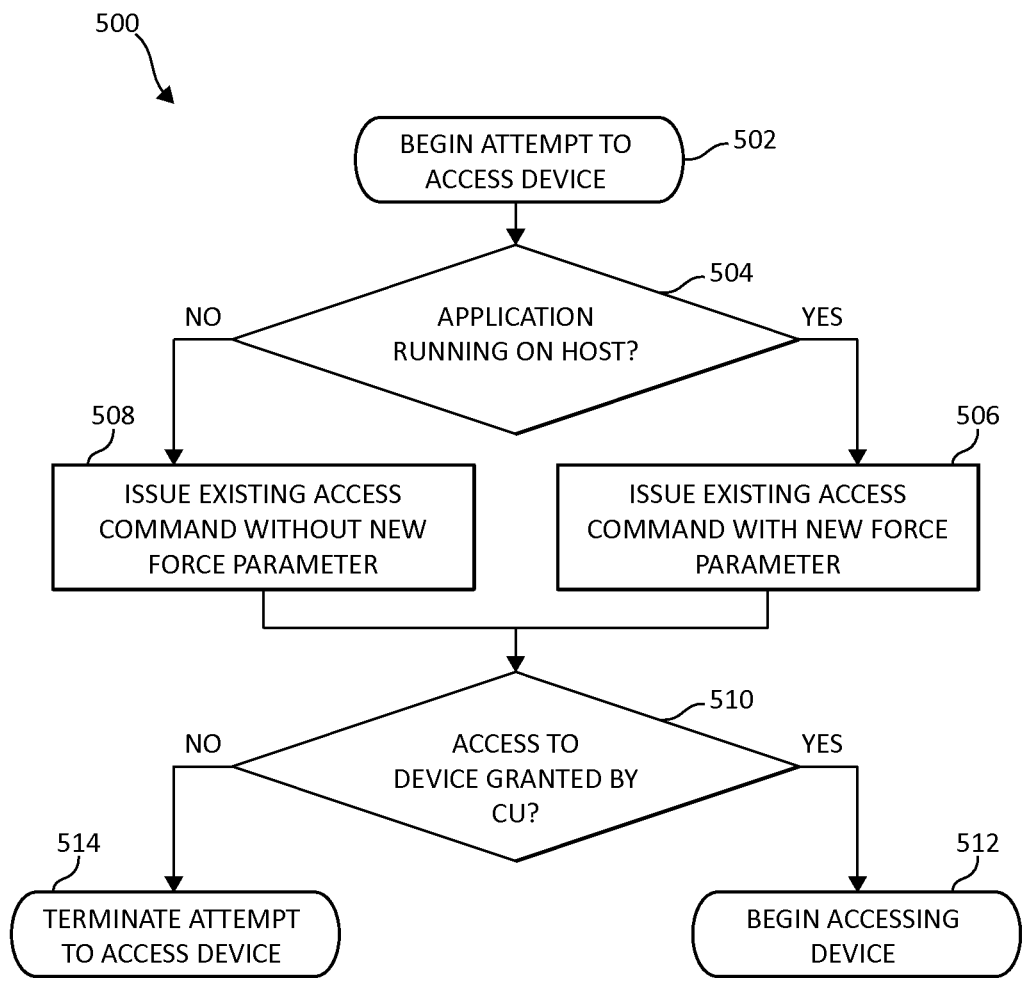
FIG. 5 is a flow diagram of a method of adding a new sharing host system, in accordance with an embodiment.

FIG. 5 is a flow diagram of a method 500 of adding a new sharing agent host system. According to an embodiment, a new sharing agent host system, e.g., agent host system 408, may attempt to access source storage device 102 during the running of the application at 502. For example, agent host system 408 may attempt to access source storage device 102 after master host system 104 has confirmed the presence of the application on agent host systems 104, 106, and 110. In such case, a determination is made as to whether the application on new agent host system 408 is running at 504. In an embodiment, new agent host system 408 sends an access command to source storage device 102. If the application is verified as running on new agent host system 408, the new agent host system 408 issues access commands that include a "force parameter" at 506. The force parameter is a bit included on the access command that allows the access command to effectively pass through the fence and to communicate with the device 102. If the application is not verified on new agent host system 408, new agent host system 408 issues an access command without the force parameter at 508.

Figure 6:
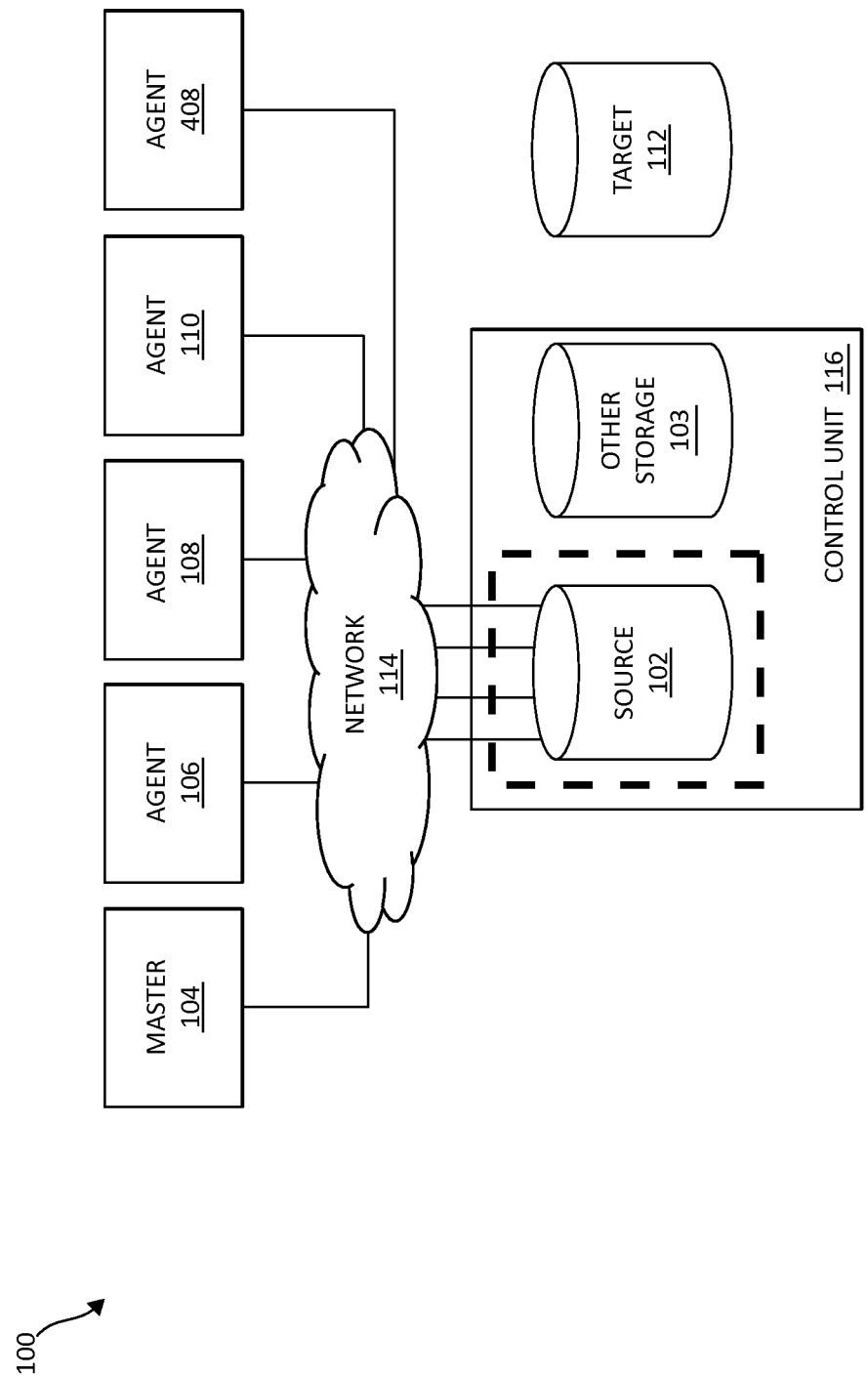
FIG. 6 is a block diagram of the system shown in FIG. 1 during yet a step of the method depicted in FIG. 5.
Figure 7:
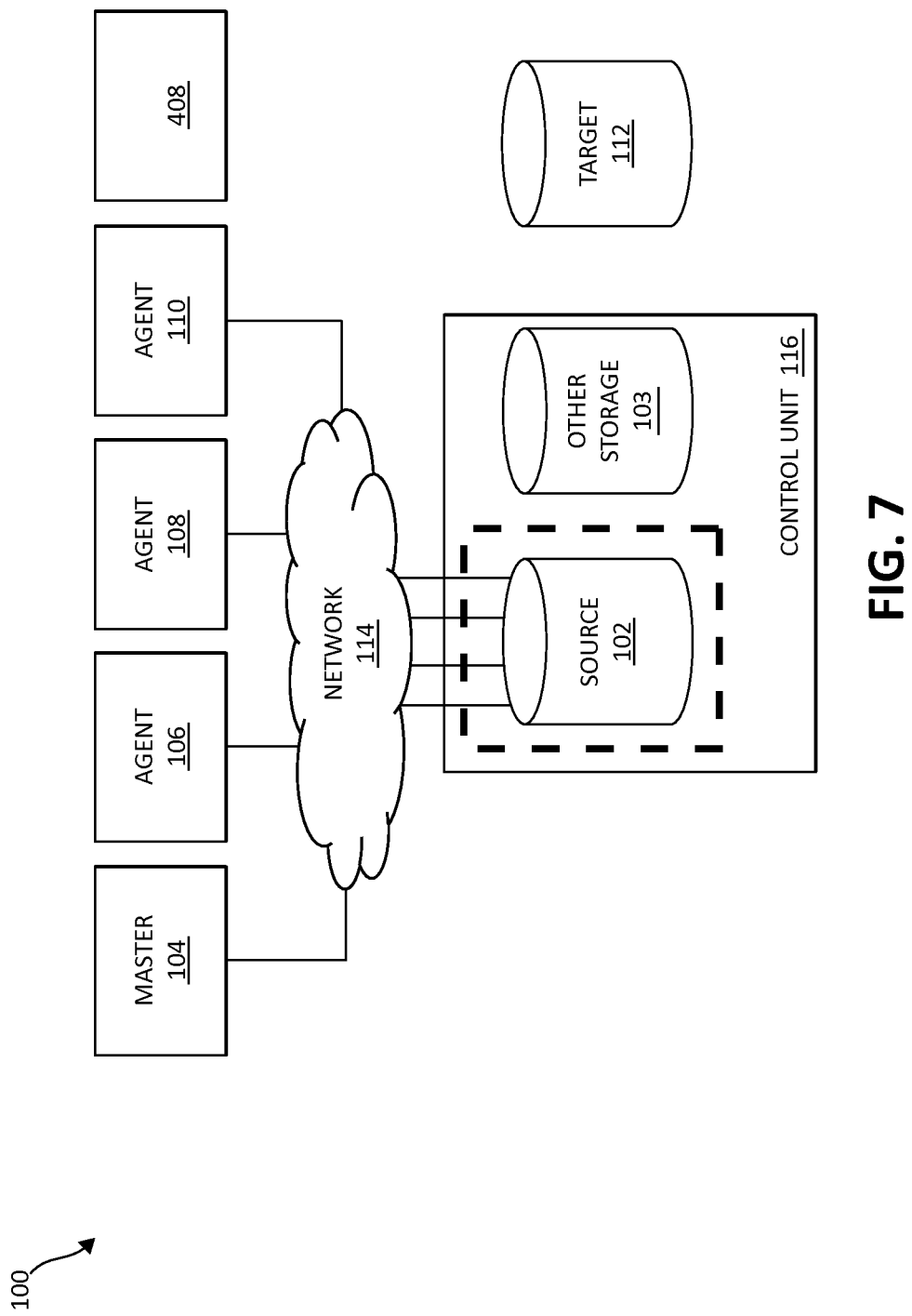
FIG. 7 is a block diagram of the system shown in FIG. 1 during yet a step of the method depicted in FIG. 5.

A determination is made as to whether access is granted to the device at 510. In an embodiment, when device 102 receives the access command with the force parameter from new agent host system 408, as illustrated in FIG. 6, new agent host system 408 is allowed to begin accessing device 102 at 512. More particularly, device 102 is allowed to successfully execute the access command from new agent host system 408 (for example, by sending an access success response thereto) to thereby be brought online. When device 102 receives the access command without the force parameter from new agent hosts system 408, such operation causes device 102 not to grant access as shown in FIG. 7. In an embodiment, notification is sent from source storage device 102 to agent host system 408 of a failure of the access command. As a result, attempts to access device 102 by new agent host system 408 are terminated at 514.

Figure 8:
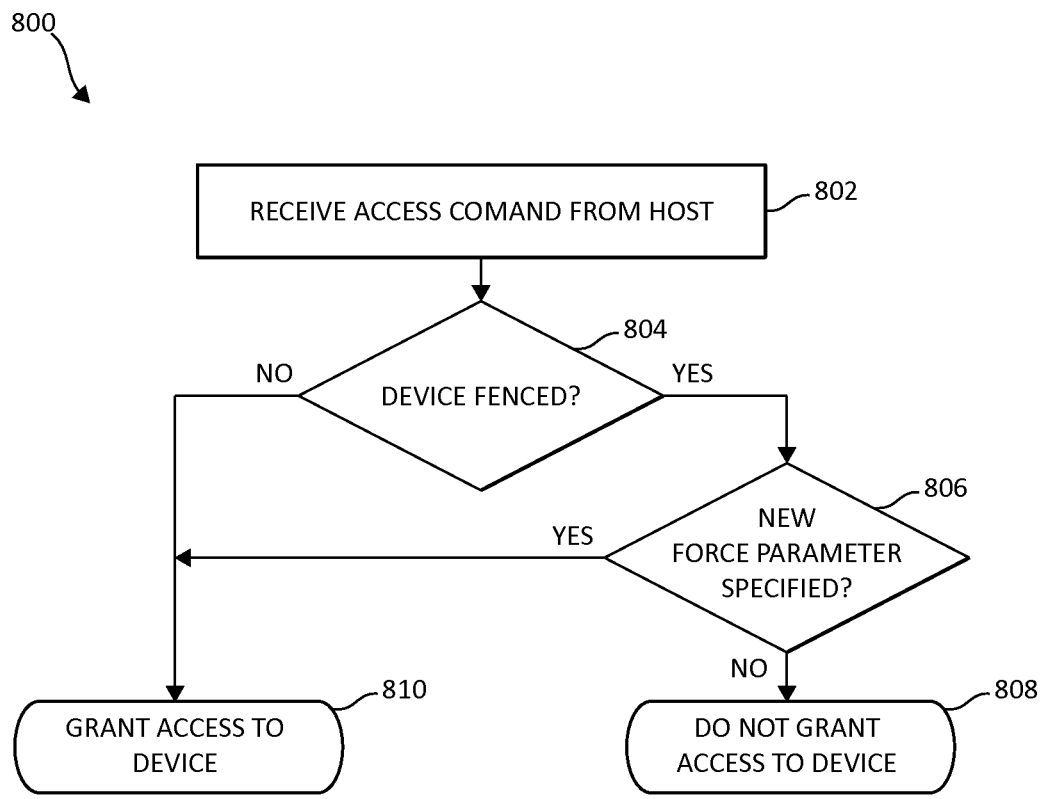
FIG. 8 is a flow diagram of a method of operating a control unit including a source storage device, in accordance with an embodiment.

Turning now to FIG. 8, a flow diagram of a method 800 for operating control unit 116 is provided. Method 800 begins with control unit 116 receiving an access command from a new sharing host system at 802. A determination is made as to whether device 102 on which control unit 116 resides is fenced at 804. If device 102 is fenced, a determination is made as to whether a new force parameter is specified in the access command at 806. If not, the new sharing host system is not granted access to device 102 at 808. If the new force parameter is specified in the access command from the new sharing host system, the system is granted access at 810. If device 102 is not fenced, the new sharing host system is granted access at 810.

By including the above-described new commands in an application and by issuing the new commands at initiation of the application, access to a storage device in a system including a plurality of host systems is improved. Use of the new commands and inclusion of a force parameter on existing access commands allows the system to detect when a new host system accesses the storage device and thus provides improved management and tracking of I/Os that are issued from the new host systems.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of controlling access to a storage device shared by a plurality of host systems, the method comprising:
    confirming a presence of an application on each host system of the plurality of host systems accessing the storage device;
    after confirming the presence of the application on each host system accessing the storage device, running the application allowing each host system to access the storage device;
    receiving a request from a new host system to access the storage device;
    verifying a presence of the application on the new host system;
    if the presence of the application is verified on the new host system, providing the new host system with access to the storage device; and
    if the presence of the application is not verified on the new host system, denying the new host system access to the storage device; wherein:
        the plurality of host systems includes a master host and an agent host, the new host system being the agent host;
        the step of confirming includes receiving at the source storage device a fence command from the master host to set a fence at the storage device; and
        the step of verifying includes:
            receiving at the storage device an access command from the new host system, the access command including a bit defining a force parameter allowing an access success response to be issued to the new host system after the fence has been set, and
            sending the access success response from the storage device to the new host system, if the new host system includes the application.

2. The method of claim 1, wherein the plurality of host systems includes a master host and agent hosts and the step of confirming includes:
    receiving at the storage device a fence command from the master host to set a fence at the storage device, the fence command included in the application present on the master host.

3. The method of claim 1, wherein the plurality of host systems includes a master host and agent hosts and the step of confirming is performed by the master host.

4. The method of claim 1, wherein:
the plurality of host systems includes a master host and an agent host, the new host system being the agent host;
the step of confirming includes receiving at the storage device a fence command from the master host to set a fence at the storage device; and
the step of verifying includes:
receiving at the storage device an access command from the new host system, and
sending notification from the storage device to the new host system of failure of the access command, if the new host system does not include the application.

5. The method of claim 1, wherein:
the application is a migration application;
the storage device is a source storage device;
the step of running the application includes migrating data from the source storage device to a target storage device; and
the step of receiving the request from the new host system occurs during the migrating of the data.

6. A system for controlling access to a storage device shared by a plurality of host systems, the system comprising:
a memory; and
at least one processing device coupled to the memory, the at least one processing device:
confirming a presence of an application on each host system of the plurality of host systems accessing the storage device,
after confirming the presence of the application on each host system accessing the storage device, running the application allowing each host system to access the storage device,
receiving a request from a new host system to access the storage device,
verifying a presence of the application on the new host system,
if the presence of the application is verified on the new host system, providing the new host system with access to the storage device, and
if the presence of the application is not verified on the new host system, denying the new host system access to the storage device; wherein the plurality of host systems includes a master host and an agent host, the new host system being the agent host, and the at least one processing device is:
during the step of confirming, receiving at the storage device a fence command from the master host to set a fence at the storage device; and
during the step of verifying:
receiving at the storage device an access command from the new host system, the access command including a bit defining a force parameter allowing an access success response to be issued to the new host system after the fence has been set, and
sending the access success response from the storage device to the new host system, if the new host system includes the application.

7. The system of claim 6, wherein the plurality of host systems includes a master host and an agent host and the at least one processing device, during the step of confirming, is:
receiving at the storage device a fence command from the master host to set a fence at the storage device, the fence command included in the application present on the master host.

8. The system of claim 6, wherein the plurality of host systems includes a master host and an agent host and the step of confirming is performed by the master host.

9. The system of claim 6, wherein the plurality of host systems includes a master host and an agent host, the new host system being the agent host, and the at least one processing device is:
during the step of confirming, receiving at the source storage device a fence command from the master host to set a fence at the storage device; and
during the step of verifying:
receiving at the storage device an access command from the new host system, and
sending notification from the storage device to the new host system of failure of the access command, if the new host system does not include the application.

10. The system of claim 6, wherein:
the application is a migration application;
the storage device is a source storage device;
running the application includes migrating data from the source storage device to a target storage device; and
receiving the request from the new host system occurs during the migrating of the data.

11. A physical non-transitory computer storage medium including a computer program product for controlling access to a storage device shared by a plurality of host systems, the physical computer storage medium comprising:
computer code for confirming a presence of an application on each host system of the plurality of host systems accessing the storage device;
computer code for, after confirming the presence of the application on each host system accessing the storage device, running the application allowing each host system to access the storage device;
computer code for receiving a request from a new host system to access the storage device;
computer code for verifying a presence of the application on the new host system;
computer code for, if the presence of the application is verified on the new host system, providing the new host system with access to the storage device; and
computer code for, if the presence of the application is not verified on the new host system, denying the new host system access to the storage device; wherein:
the computer code for confirming includes computer code for receiving at the storage device a fence command from a master host of the plurality of host systems to set a fence at the storage device; and
the computer code for verifying includes:
computer code for receiving at the storage device an access command from the new host system, the access command including a bit defining a force parameter allowing an access success response to be issued to the new host system after the fence has been set, and
computer code for sending the access success response from the storage device to the new host system, if the new host system includes the application.

12. The physical computer storage medium of claim 11, wherein the computer code for confirming includes:
computer code for receiving at the storage device a fence command from a master host to set a fence at the storage device, the master host and agent hosts being included in the plurality of host systems.

13. The physical computer storage medium of claim 11, wherein the computer code for confirming is performed by a master host included in the plurality of host systems.

14. The physical computer storage medium of claim 11, wherein:
the computer code for confirming includes computer code for receiving at the storage device a fence command from the master host of the plurality of host systems to set a fence at the storage device; and
the computer code for verifying includes:
computer code for receiving at the storage device an access command from the new host system, and
computer code for sending notification from the storage device to the new host system of failure of the access command, if the new host system does not include the application.

15. The physical computer storage medium of claim 11, wherein the computer code for running the application comprises computer code for running a migration application.

16. The physical computer storage medium of claim 15, wherein the storage device is a source storage device and the physical computer storage medium further comprises computer code for swapping the source storage device with the target storage device after migration is complete.

* * * * *